July 31, 1945.   M. C. PERSONS   2,380,702
AIRPLANE MOORING APPLIANCE
Filed June 12, 1944
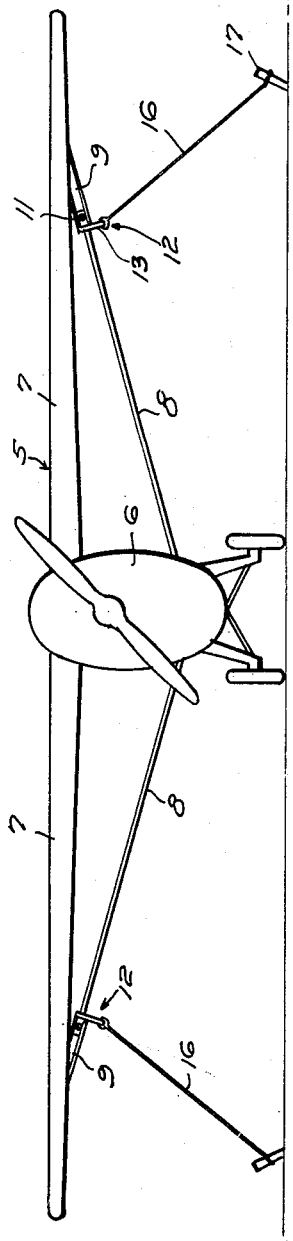
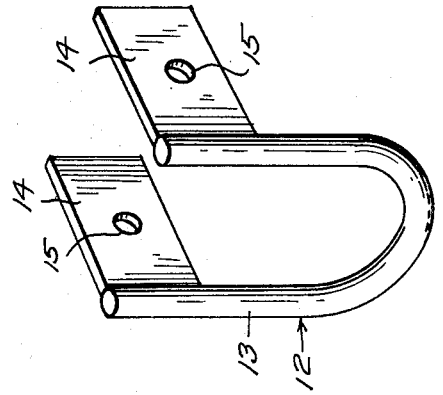
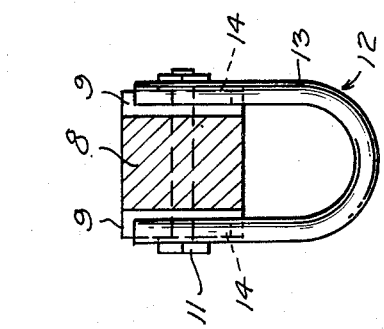
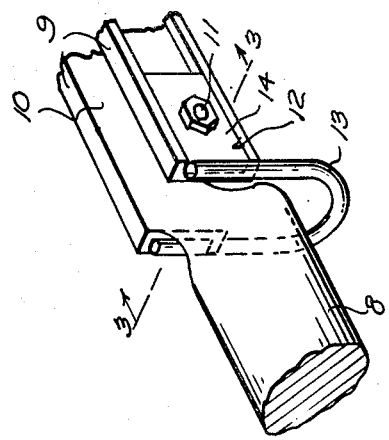
Inventor
MERLE C. PERSONS,
By Clarence A. O'Brien
and Harvey B. Jacobson
Attorneys Patented July 31, 1945

2,380,702

UNITED STATES PATENT OFFICE 2,380,702

AIRPLANE MOORING APPLIANCE

Merle C. Persons, Fort Sill, Okla.

Application June 12, 1944, Serial No. 539,834

1 Claim. (Cl. 244—110)

This invention relates to new and useful improvements in mooring devices for use in conjunction with aircraft.

The principal object of the present invention is to provide a simple and inexpensive appliance which can be attached to the struts of light type airplane for ground mooring the same.

Another important object of the invention is to provide a mooring appliance for aircraft which will in no way interfere with the operation of the aircraft or in any way weaken the structural parts thereof.

Other objects and advantages of the invention will become apparent to the reader of the following description.

In the drawing:

Figure 1 is a front elevational view of an aircraft showing the mooring appliances in use.

Figure 2 is a fragmentary enlarged perspective view showing a lift strut, lift strut fitting and mooring appliance in fastened relation.

Figure 3 is a cross section on the line 3—3 of Figure 2.

Figure 4 is a perspective view of the mooring appliance separated from the aircraft structure.

Referring to the drawing wherein like numerals designate like parts, it can be seen that numeral 5 generally refers to a conventional monoplane having a fuselage 6 and wings 7, 7. This type of aircraft also has lateral lift struts 8, 8, which are connected to the corresponding wings by fittings 9.

Each fitting is made up of a pair of channeled members 10, 10 and customarily a bolt 11 is disposed through registering openings in the channeled members 9 and the adjacent end portion of the lift strut 8.

The present invention is generally referred to by numeral 12 and consists of a U-shaped member 13 having parallel laterally disposed wing members 14, 14 projecting from the upper ends of the leg portions thereof. Each of these wing members has an opening 15 therein and these openings register with the openings in the channeled members 9 and the strut 8 to accommodate the same bolt 11. Further, these wing members 14 fit in the channels of the channeled members 9 so that there can be no vertical play of these wing members. Obviously, the bolt 11 prevents any outward displacement of the wing members. It is to be understood that there is some flexibility in this device so that it may be flexed to permit disposition of the element in the position shown in Figure 2, after which the same is positively secured in place by the bolt 11.

Mooring lines 16 are attached to the bight portions of the U-shaped members 13 and connected to ground stakes 17. Thus, the airplane is firmly moored to the ground.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In an aircraft having a wing, strut and wing fitting for the strut, the wing fitting consisting of channeled members straddling the strut, said channeled members and strut being formed with registering openings, a U-shaped member provided with parallel wing members on its leg portions adapted to be disposed in the channels of the channeled members and being formed with openings registering with the aforementioned openings, and a bolt disposed through all of the said registering openings for securing the opening-formed parts together, said U-shaped member forming a mooring line attachable eye.

MERLE C. PERSONS.